United States Patent [19]

Takaoka et al.

[11] 4,219,262
[45] Aug. 26, 1980

[54] CAMERA ELECTRICAL SELF-TIMER

[75] Inventors: Yukio Takaoka, Asaka; Masahiro Kawasaki, Tokyo, both of Japan

[73] Assignee: Asahi Kogaku Kogyo Kabushiki Kaisha, Tokyo, Japan

[21] Appl. No.: 972,152

[22] Filed: Dec. 21, 1978

[30] Foreign Application Priority Data

Dec. 27, 1977 [JP] Japan .............................. 52/159572

[51] Int. Cl.² ............................ G03B 7/08; G03B 9/02
[52] U.S. Cl. ..................................... 354/38; 354/238; 354/266
[58] Field of Search ....................... 354/43, 44, 36, 38, 354/29, 30, 238, 271, 289, 267, 50, 51, 266

[56] References Cited

U.S. PATENT DOCUMENTS

| 3,777,637 | 12/1973 | Kuramoto et al. ................ 354/44 X |
| 4,161,354 | 7/1979 | Kurei .................................. 354/43 X |

Primary Examiner—L. T. Hix
Assistant Examiner—W. J. Brady
Attorney, Agent, or Firm—Sughrue, Rothwell, Mion, Zinn and Macpeak

[57] ABSTRACT

A self-timer in a camera which has a shutter priority automatic exposure adjustment (EE) mode, a manual exposure adjustment mode or an aperture priority automatic exposure adjustment (ES) mode, or all three exposure adjustment modes. In the (EE) mode, light passing through a lens aperture is received by a light receiving element while the lens aperture is being stopped down. When an aperture value (the quantity of light) suitable for the preset shutter speed and film sensitivity is obtained the supply of current of an aperture control magnet having attracted an aperture locking lever is interrupted to lock the operation of the aperture thereby to determine an aperture value. Simultaneously the locking of a top curtain is released by the lever. The camera has an interlocking timer circuit in which, in modes other than the (EE) mode, the supply of current to the aperture control magnet is interrupted in a period of time such that a period of time required for stopping down the aperture to its minimum aperture value is made slightly longer, thereby to release the top curtain. A switch for changing the time constant of the interlocking timer circuit is provided to increase the operating time of the interlocking timer circuit.

8 Claims, 6 Drawing Figures

CAMERA ELECTRICAL SELF-TIMER

BACKGROUND OF THE INVENTION

This invention relates to a self-timer and its security device in a camera having a shutter priority automatic adjustment (EE) mode, a manual exposure adjustment mode or an aperture priority automatic exposure adjustment (ES) mode.

In the (EE) mode, a camera light passing through a lens aperture is reflected by the shutter top curtain while the lens aperture is being stopped down. The reflected light is received by a light receiving element and when a correct aperture value (the quantity of light) is obtained with respect to preset shutter speed ($T_V$) and film sensitivity ($S_V$) the supply of current to an aperture control magnet having attracted an aperture control lever is interrupted. The magnet is adapted to lock an operating member which is operated in association with the stopping-down operation, and when interrupted will stop the stopping-down operation thereby to determine an aperture value. The locking of the top curtain is at the same time released by the aperture control lever.

In the case where, even if the lens aperture is stopped down to its minimum aperture value and the correct aperture value (the quantity of light) cannot be obtained, it is impossible to deenergize the aperture control magnet without a variation in the quantity of light from the object. Therefore, in this case, the locking of the top curtain is not released, that is, the shutter is not operated. In addition, also in the (ES) operation of the manual operation in which no aperture control is carried out, the supply of current to the aperture control magnet is not interrupted, and therefore the shutter is not operated.

In order to overcome this difficulty, an interlocking timer circuit is provided and operates to interrupt the supply of current to the aperture control magnet in a period of time such that a period of time slightly longer than that required to stop down the full-aperture to the minimum aperture. This will then release the locking of the top curtain. In this connection, if after the shutter is released, the top curtain is opened to start the exposure with a delay time, the photographer may be unable to photograph the scene he wants at the proper time. Accordingly, it is suitable that the time of the interlocking timer is set to 100 ms at maximun, and 50-60 ms ordinary. If a change-over switch is provided in the circuit of the interlocking timer so that the time of the interlocking timer is set to approximately ten seconds, then the shutter is operated approximately ten seconds after the shutter is released. Therefore the interlocking timer can be used as a self-timer. Thus, an electrical self-timer can be readily obtained. However, in the (EE) mode of operation, simultaneously when the correct aperture value is obtained, the energization of the aperture control magnet is interrupted irrespective of the interlocking timer. As a result the aperture control is carried out and the locking of the top curtain is therefore released. Therefore, in this case, the interlocking timer cannot be used as the self-timer.

SUMMARY OF THE INVENTION

Accordingly, an object of this invention is to provide a camera which can be operated more readily in such a manner that the self-timer and the (EE) mode cannot be set simultaneously.

It is another object of this invention to provide an electronic self-timer mechanism that is reliable and does not impair the normal operation of the camera.

Still another object of this invention is to provide a switch mechanism that changes the time constant in an interlocking timer circuit to increase the delay time.

These and other objects of this invention are accomplished in a camera having a self-timer operable in a shutter priority automatic exposure adjustment (EE) mode, a manual exposure adjustment mode or an aperture priority automatic exposure adjustment (ES) mode, or all three exposure adjustment modes. In the (EE) mode, light passing through a lens aperture is received by a light receiving element while the lens aperture is being stopped down. When an aperture value suitable for the preset shutter speed and film sensitivity is obtained the supply of current of an aperture control magnet having attracted an aperture locking lever is interrupted to lock the operation of the aperture. Simultaneously the locking of a top curtain is released by the lever. The camera has an interlocking timer circuit in which, in modes other than the (EE) mode, the supply of current to the aperture control magnet is interrupted. The period of timer required for stopping down the aperture to its minimum aperture value is made slightly longer, thereby to release the top curtain. A switch for changing the time constant of the interlocking timer circuit is provided to increase the operating time of the interlocking timer circuit.

DESCRIPTION OF THE PREFERRED EMBODIMENT

Figure 1:
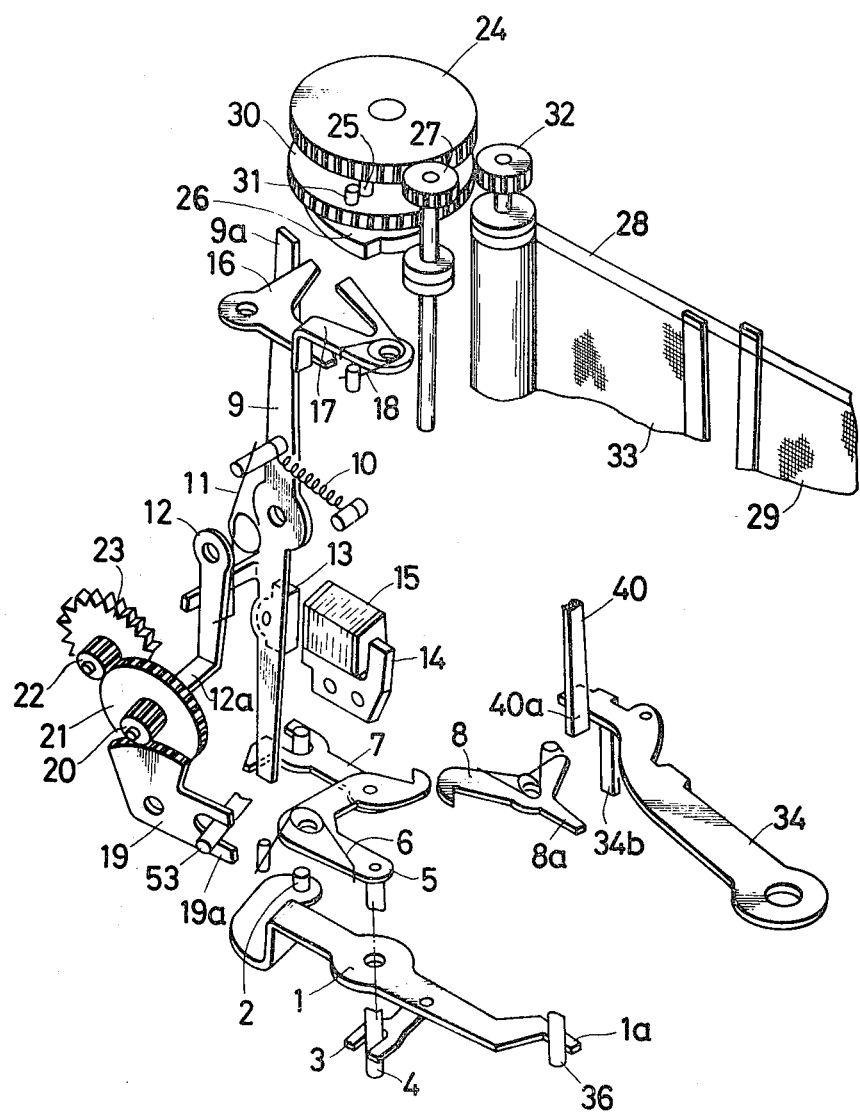
FIG. 1 is a perspective view showing an aperture control section and a top curtain locking section.

One preferred embodiment of this invention will now be described in detail with reference to the accompanying drawings. FIG. 1 shows an aperture control mechanism and a top curtain releasing device in the case where the winding operation is not yet performed. First, operations relating to the winding will be described.

(a) Charging of an operating lever 9

A cam of the winding mechanism (not shown) and a charge pin 2 abut against each other. Therefore, a charge lever 1 is turned clockwise by the winding operation. As a result, a set lever 5 is turned clockwise against the elastic force of a spring 6 by means of a fork-shaped lever 3 which is rotatably connected to the charge lever 1. Therefore, an auxiliary set lever 7 connected rotatably to the set lever 5 is displaced to the right, as viewed in FIG. 1. This causes the operating lever 9 to turn counterclockwise against the elastic force of a spring 10. As a result, an armature 13 mounted pivotally on the operating lever 9 is brought into contact with the iron core 14 of an aperture control magnet 15 which is fixedly secured to the camera body.

At the same time, a control lever 12 which is elastically coupled to the operating lever 9 by means of a spring 11 is turned counterclockwise. As a result a locking section 12a is disengaged from a star wheel in the final stage of a speed slowing mechanism. On the other hand, because one end portion 9a of the operating lever 9 is displaced, a top curtain locking lever 17 is turned clockwise via a relay lever 16 with the aid of a spring 18, and is then held ready for engagement with a top curtain cam 26. The aforementioned winding cam is designed so that when the armature 13 is brought into contact with the iron core 14, the auxiliary set lever 5 engages the locking lever 8. In this case the displacement of the charge lever 1 is at a maximum. Therefore, in the following winding operation, the charge lever 1 is restored by turing counterclockwise, and therefore the fork-shaped lever 3 is restored to a position not in contact with the pin 4.

(b) Charging of shutter curtains

As a result of the winding operation, an upper speed changing gear 24 engaged with a gear in the winding mechanism (not shown) is turned. A top curtain 29 is wound via a pulling element 28 by a top curtain pinion 27 engaging the speed changing gear 24. Thus, the top curtain 29 is charged. On the other hand, a lower speed changing gear 30 is turned by means of a pin 25 embedded in the speed changing gear 24 and a pin 31 embedded in the lower speed changing gear 30. A bottom curtain 33 is wound by a bottom curtain pinion 32 engaging the lower speed changing gear 30. Thus, the bottom curtain 33 has been charged. Because a top curtain locking cam 26 combined, integrally with the speed changing gear 24 is positioned so that when the winding operation has been completed, it engages the aforementioned top curtain locking lever 17. The top curtain locking cam 26 is locked upon completion of the winding operation.

(c) Charging of a mirror box mechanism

Figure 2:
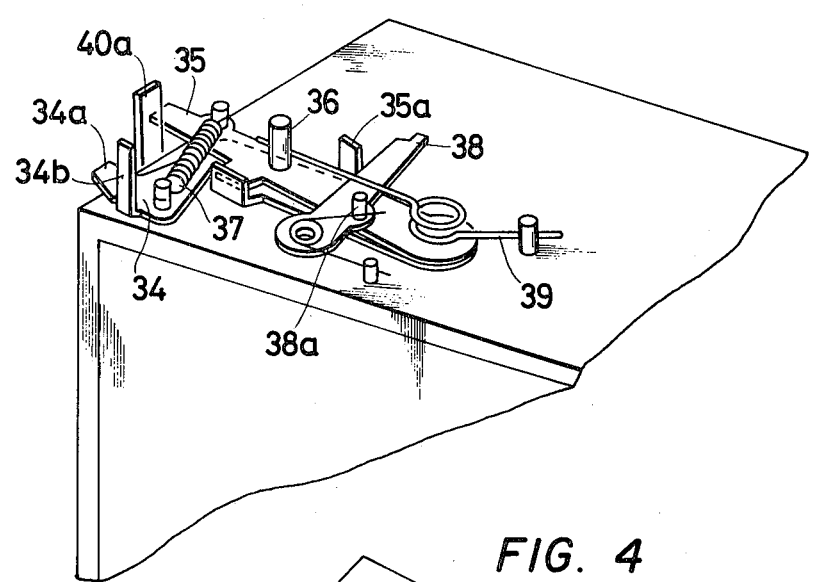
FIG. 2 is a perspective view showing a mirror box mechanism on the lower part of the body of a camera.

The charge lever 1 is turned clockwise by the winding operation as described with reference to FIG. 1. In this case, a pin 36 engages one end portion 1a of the charge lever 1 and is fixedly secured to a driving lever 35. This is shown in FIG. 2, where the driving lever 35 is turned clockwise while energizing a restoring spring 39 and a mirror elevating spring 37. As a result a locking part 35a is engaged with a second locking lever 38. Thus, the mirror box mechanism has been charged.

The clockwise turning of the driving lever 35 causes a first operating lever 34 to tend to turn clockwise via the mirror elevating spring 37. In addition, one end portion 34a of the first operating lever 34 imparts a force to one end portion 40a of a second operation lever 40 shown in FIG. 3 to displace the one end portion right as viewed in FIG. 3. However, the second operating lever 40 is locked by a bent portion 47a of a first locking lever 47 (FIG. 3) and therefore the mirror elevating spring is energized. On the other hand, a lens aperture release plate 54 is energized in the stopping-down direction, or upwardly in FIG. 3. A slide plate 51 engaging the aperture release plate 54 tends to displace itself against the elastic force of a restoring spring 52 but it is detained by a bent portion 50a of a restoring lever 50. The restoring lever 50 is coupled to a lever 44 by means of a coupling spring 45. A bent portion 44a of the lever 44 is locked by a third locking lever 49.

(d) Speed slowing mechanism

Now, the contruction of the speed slowing mechanism will be described. A coupling pin 53 in FIG. 1 is operated in association with an aperture release plate 54, on the lens side, through the slide plate 51 in FIG. 3, and is engaged with an elongated groove 19a in a sector-shaped gear 19. The sector-shaped gear 19 engages a first pinion gear 20, and the operation of the gear 19 is transmitted through a spur gear 21 and a second pinion gear 22 to the star wheel. Thus, the object of this speed slowing mechanism is to improve the control accuracy by enlarging the amount of displacement of the lens aperture release plate 54 and also to improve the durability by reducing the locking force.

A one-way clutch is provided between the first pinion gear 20 and the spur gear 31, so that, when the coupling pin 53 is moved upwardly as viewed in FIG. 1, the first pinion gear 20 and the spur gear 21, being formed as one unit, rotate the star wheel 23. When the star wheel 23 has been locked, the coupling pin 53 can be returned to its lower position to restore the aperture to the full-aperture.

(e) Release mechanism

The operation, starting from the release operation, of the camera will now be described. Upon depression of a release button (not shown), the release lever 48 is moved downwardly in FIG. 3. As a result the first locking lever 47 is turned clockwise and is disengaged from the second operating lever 40. Therefore, the first operating lever 34 is turned clockwise, as viewed in FIG. 2, by the mirror elevating spring 37, to thereby cause the second operating lever 40 to turn counterclockwise as viewed in FIG. 3.

The second operating lever 40 is brought into contact with a cam part 42a of a mirror elevating lever 42 by a pin 41 secured to the second operating lever 40 to turn the mirror elevating lever 42 clockwise. As a result, a mirror elevating gear 43, engaging with the gear provided at the end of the mirror elevating lever 42, is turned counterclockwise. This action causes a mirror (not shown) to be elevated.

At the end of the operation, i.e., at the end of the mirror elevation, the second operating lever 40 kicks the third locking lever 49 with its bent portion 40b to turn the lever 49 clockwise. This releases the engagement of the lever 44. As a result, the lever 44 and the restoring lever 50 are turned counterclockwise by the spring 46. Therefore, the slide plate 51 having been held by the restoring lever 50 begins to rise, and it commences to stop down the lens aperture. When the coupling pin 53 of the slide plate 51 is moved, the speed slowing mechanism shown in FIG. 1 starts its operation.

On the other hand, the auxiliary set lever 7 has been locked by the locking lever 8 in FIG. 1. However, because the first operating lever 34 in the mirror box mechanism is turned by the release operation of the camera, the bent portion 34b of the first operating lever 34 kicks one end portion 8a of the locking lever 8. Therefore, the auxiliary set lever 7 slides to the left, as viewed in FIG. 1 by action of the spring 6. That is, the lever 7 is restored. At the same time, the operating lever 9 tends to turn, however, the turning of the operating lever 9 is prevented because in this case the aperture control magnet 15 has been energized to attract the armature 13.

(f) Control of aperture

Figure 4:
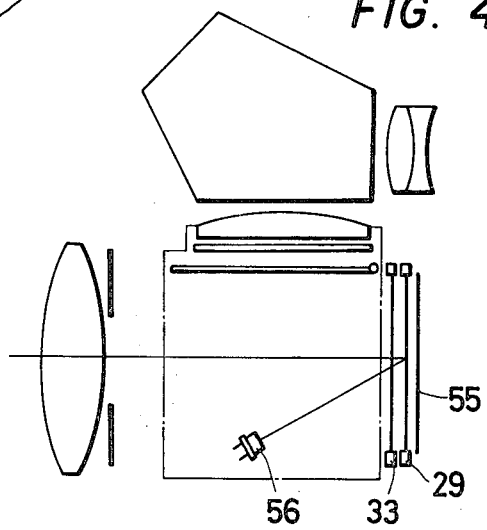
FIG. 4 is a sectional view showing the arrangement of a light receiving element.

An arrangement for controlling an aperture value in response to variations in the quantity of incident light which are caused by stopping down the aperture, will now be described. A view finder observing mirror has been already elevated. A light receiving element 56 is provided out of the photographing incident light path as shown in FIG. 4. A reflection treatment is applied to the photographing lens side of the top curtain 29, so that the light element 56 receives the light which has passed through the photographing lens and reflected by the top curtain 29. An APEX calculation $B_V - A_V$ is carried out according to the brightness of an object and the variation in the quantity of light due to the stopping-down operation. Then, the value $S_V$ of a film sensitivity set is added to the result of this calculation. That is, the calculation of shutter speed $T_V = S_V + B_V - A_V$ is carried out.

The value $T_V$ varies with the value $B_V - A_V$ which is varied as the stopping-down operation is advanced. The value $T_V$ is compared with the value $T_V$ of a manually set shutter speed. When the calculated value $T_V$ coincides with the manually set value $T_V$, the supply of current to the aperture control magnet 15 is suspended by a control circuit. As a result the armature 13 is disengaged from the iron core 14, and therefore the operating lever 9 is turned clockwise by means of the spring 10. At the same time, the control lever 12 coupled through the spring to the operating lever 9 is also turned clockwise and is therefore engaged with the star wheel 23 in the speed slowing mechanism.

As a result, the lens aperture releasing plate 54 is stopped via the coupling pin 53 and the slide plate 51 and the stopping-down operation is stopped at a suitable value. As the operating lever 9 is further turned clockwise, one end portion 9a kicks the relay lever 16 to disengage the top curtain locking lever 17 from the top curtain cam 26, so that the top curtain starts running. However, in the case where the aperture is stopped down to the minimum aperture value, and the correct aperture value cannot be obtained, or in the case where a manual exposure operation in which no aperture is controlled or the (ES) operation is effectuated, no signal is provided by the control circuit. Therefore, in these cases, the operating lever 9 is maintained attracted by the aperture control magnet 15 by means of the armature 13. As a result the top curtain 29 cannot run and the exposure is not carried out.

In order to overcome this difficulty, an interlocking timer is provided to interrupt the supply of current to the aperture control magnet 15 in a period of time slightly longer than the period of time required to stop down the aperture to its minimum value. Therefore, even in the case where, the aperture is stopped down to the minimum value and the correct aperture value cannot be obtained, or even in the case where a manual exposure operation in which there is no aperture control or in the (ES) operation, the supply of current to the aperture control magnet 15 is interrupted by means of the interlocking timer. In these cases the top curtain is released to run.

Figure 3:
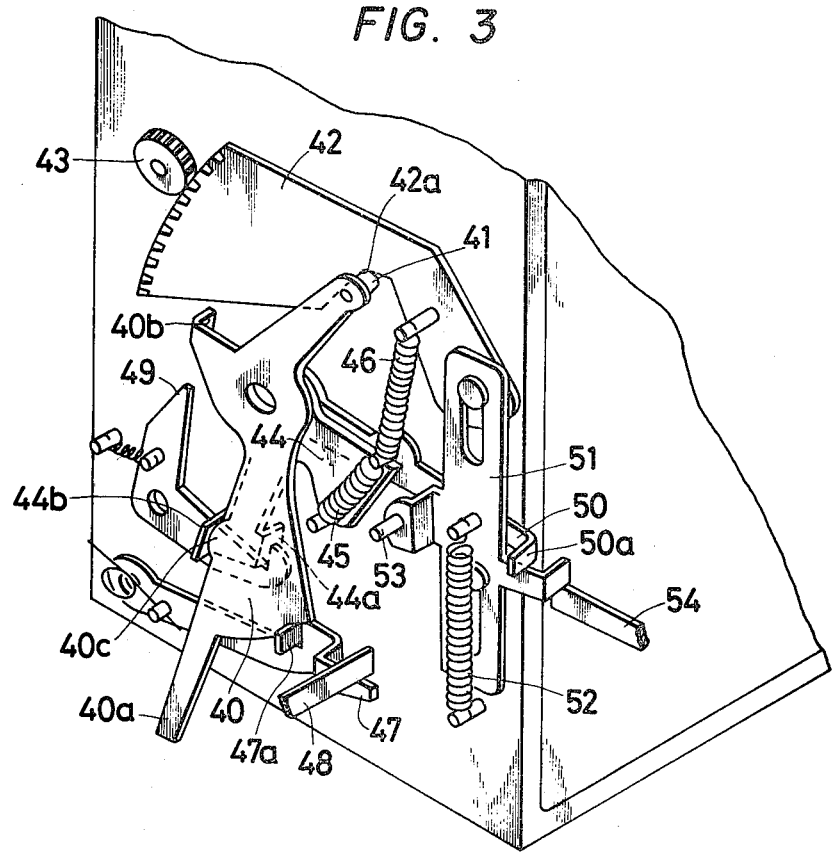
FIG. 3 is a perspective view showing the mirror box mechanism on the side of the camera body.

Thereafter, the bottom curtain 33 is run in a period of time set by an exposure time adjusting mechanism (not shown). At the end of the run of the bottom curtain, the pin 38a fixedly secured to the second locking lever 38 is kicked to turn the latter 38 clockwise, whereby the locking of the driving lever 35 is released. As a result, the driving lever 35 is restored by means of the restoring spring 39, whereby the second operating lever 40 is restored. In FIG. 3, a protrusion 40c of the second operating lever 40 depresses a bent portion 44b of the lever 44, to restore the restoring lever 50 via the spring 45. Accordingly, the slide plate 51 is restored, and therefore the lens aperture is restored to its full-aperture state.

In this case, the speed slowing mechanism has been locked, however, because the one-way clutch is provided between the first pinion gear 20 and the spur gear 21, the slide plate 51 can be restored. The mirror elevating lever 42 is restored by means of the spring 46 and the mirror is restored. The lever 44 is engaged with the third locking lever 49. Thus, all of the necessary operations have been achieved.

Figure 5:
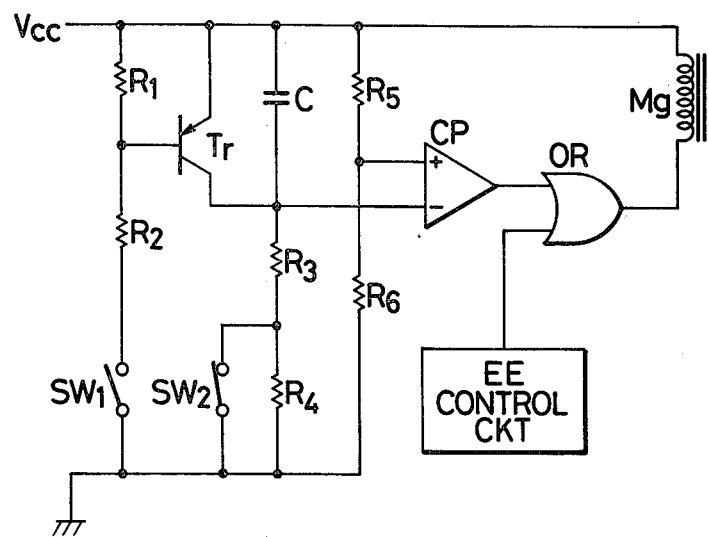
FIG. 5 is an electrical circuit diagram illustrating an interlocking timer circuit.

The typical photographing operation is as described above. Now, the circuit of the interlocking timer of this invention will be described with reference to FIG. 5. The circuit, as shown in FIG. 5, comprises: a trigger switch SW1 and resistors $R_1$ and $R_2$ in series. A transistor Tr is base coupled between $R_1$ and $R_2$. A capacitor C and a resistor $R_3$ provide a delay time. Resistors $R_5$ and $R_6$ provide for a reference voltage and a comparator CP is used for compairing the reference voltage with the terminal voltage of the capacitor C at its negative input. During a normal time period, a self-timer switch SW2 is kept closed (on) to short-circuit the resistor $R_4$. The terminal voltage Vc of the capacitor C can be represented by the following equation:

$$Vc = (1 - e^{-\frac{1}{CR_3}t})V_{cc}$$

where t is the lapse of time from the time instant when the trigger switch SW1 is turned off.

On the other hand, the reference voltage Vs can be represented by the following equation:

$$Vs = \frac{R_5}{R_5 + R_6} V_{cc}$$

When the values Vc and Vs coincide with each other, the comparator CP generates an output signal, which is applied through an OR circuit to an aperture control magnet Mg to deenergize the latter. In the (EE) mode of operation, when the lens is stopped down to the correct exposure, an (EE) control circuit provides a signal to deenergize the aperture control magnet Mg. However, the case exists where the lens is stopped down to the minimum aperture value and still the correct exposure value cannot be obtained, or in the cases of the manual exposure and (ES) operation, the (EE) control circuit provides no output signal.

In these cases, the aperture control magnet Mg is deenergized in a period of time corresponding to the value of resistor $R_3$ in the interlocking timer circuit, to release the top curtain. The period of time corresponding to the resistor $R_3$ is set from approximately 50 ms to 100 ms, for the following reason. If, in the (ES) operation or the manual exposure operation, the time delay from the releasing of the shutter button till the start of an actual photographing operation is excessively long, the photographer may not able to take the desired photograph of a moving object. That is, in the time interval between the decision to take a photograph when the shutter is released and the actual start of internal camera operation, the moving subject may change its orientation to destroy the picture.

When the self-switch SW2 is turned off, the terminal voltage Vc$_{self}$ of the capacitor C is:

$$Vc_{self} = (1 - e^{-\frac{1}{C(R_3+R_4)}t})Vcc$$

Accordingly, if the resistance of the resistor R$_4$ is increased so that the period of time corresponding to R$_3$+R$_4$ is in the order of ten (10) seconds, then the top curtain is allowed to run 10 seconds after the release of the shutter, in the (ES) operation or the manual exposure operation. Thus, a self-photographing system can be obtained. More specifically, an electrical self-photographing system can be obtained with one switch and one resistor.

However, if in the case where the (EE) setting and the self timer setting are effected simultaneously, the correct exposure is obtained before the lens is stopped down to the minimum aperture value in the EE operation. The (EE) control circuit produces an output signal to deenergize the aperture control magnet Mg and therefore the top curtain begins to run substantially at the same time as the shutter release operation. Thus, the self-photographing operation cannot be obtained.

Figure 6:
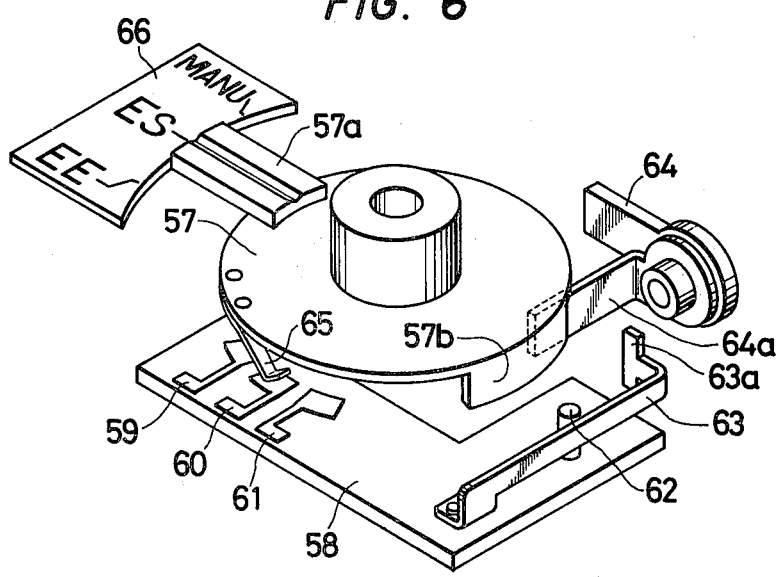
FIG. 6 is a perspective view showing a mode change-over section and a self lever section.

In view of the foregoing, a security device is provided to prevent erroneous operation. In this invention, as shown in FIG. 6, a protrusion 57b extends from a mode change-over plate 57 rotatably supported on the body, while a protrusion 64a extends from a self timer lever 64 rotatably supported on the camera body. In the case where (ES) operation or manual exposure operation is selected, a knob 57a is set to "ES" or "MANU" on an index member 66 so that a brush 65 is brought into contact with a contact 60 for the (ES) operation or a contact 59 for the manual exposure operation. In these situations the choice of (ES) operation or manual exposure operation is effected, respectively.

When the (EE) exposure operation is selected, the brush 65 is brought into contact with a contact 61 for the (EE) exposure operation and therefore the (EE) exposure operation is effected. In this case, the protrusion 57b of the mode change-over plate 57 is moved over the protrusion 64a of the self lever 64 to prevent the protrusion 64a from being turned upwardly. As a result the self lever 64 cannot be turned or otherwise actuated. Thus, the self-photographing operation cannot be performed.

If the self lever 64 is turned clockwise through 90 degrees to perform the self-photographing operation although the manual exposure operation or the (ES) operation has been set, the protrusion 64a of the self-lever 64 abuts against the top part 63a of a self timer SW$_a$ 63 move the latter 63 away from a self SW$_b$ 62 to thereby turn off a self timer SW$_6$. Thus, the self-photographing operation can be obtained. Even if, in this case, an attempt is made to turn the mode change-over plate 57 to obtain the (EE) exposure operation, it is impossible to turn the mode change-over plate 57 from "ES" to "EE" because the protrusion 57b of the mode change-over plate 57 abuts against the protrusion 64a of the self lever 64.

As is apparent from the above description, according to this invention an electrical self-timer can be simply constituted by one switch and one resistor. Furthermore, the protrusions extending from the mode change-over plate 57 and the self lever, respectively, are fail-self devices so that the self-photographing operation cannot be performed when the (EE) operation has been selected. Also, the (EE) operation cannot be selected when the self photographing operation has been selected. Thus, the effects of the invention are significant as the erroneous operations can be prevented by the simple arrangement.

It is apparent that other modifications are possible without departing from the essential scope of this invention.

We claim:

1. In a camera having multiple modes of photography including a shutter priority automatic exposure adjustment (EE) mode wherein in the (EE) mode, light passing through a lens aperture is received by a light receiving element while the lens aperture is being stopped down, and when an aperture value (the quantity of light) suitable for preset shutter speed and film sensitivity is obtained, the supply of current of an aperture control magnet having attracted an aperture locking lever is interrupted to lock the operation of the aperture thereby to determine an aperture value and simultaneously the locking of a top curtain is released by said lever, the improvement comprising; an interlocking timer circuit wherein in modes other than the (EE) mode, the supply of current to said aperture control magnet is interrupted in a period of time longer than a period of time required for stopping down the aperture to its minimum aperture value thereby to release the top curtain; and switch means in said circuit for changing the time constant of said interlocking timer circuit to increase the operating time of said interlocking timer circuit.

2. A camera as claimed in claim 1, further comprising an exposure adjustment mode change-over member provided with an engaging section, and a self-timer lever coupled to said switch means for changing the time constant of said interlocking timer circuit provided with an engaging section, whereby said engaging section of said exposure adjustment mode change-over member is designed so that when said exposure adjustment change-over member is set to a position designating an (EE) mode of operation, said engaging section of said exposure adjustment mode change-over member enters a region, obtained when the self-timer is set, of said engaging section of said self-timer lever, and said engaging section of said self-timer lever is configured whereby when the self-timer is set, said engaging section of said self-timer lever enters a region, obtained when the (EE) mode is set, of said engaging section of said exposure adjustment mode change-over member.

3. The camera of claims 1 or 2 wherein said camera includes a manual exposure mode of photography.

4. The camera of claims 1 or 2 wherein said camera includes an aperture priority automatic exposure adjustment mode of photography.

5. The camera of claims 1 or 2 wherein said camera includes both a manual exposure mode of photography and an aperture priority automatic exposure adjustment mode of photography.

6. The camera of claim 1 wherein the time period of interruption of said control magnet in the range of 50 ms to 100 ms and said interlocking circuit comprises a first resistor and capacitor in series to set the value of said period of interruption.

7. The camera of claim 6 further comprising a second resistor in series with said first resistor and said switch means disposed in parallel with said second resistor to short circuit said second resistor in said circuit when closed.

8. The camera of claim 2 wherein said mode changeover member comprises a plate member and said engaging section comprises a protrusion extending from said plate member, said plate member further comprising a brush member selectively engaging contacts for a particular mode of operation.

* * * * *